Patented Apr. 22, 1930

1,755,502

UNITED STATES PATENT OFFICE

WILLIAM ARTHUR COLLINGS, OF LOS ANGELES, CALIFORNIA, ASSIGNOR TO SILICA PRODUCTS CO., OF LOS ANGELES, CALIFORNIA, A CORPORATION OF DELAWARE

HYDRAULIC CEMENT AND OTHER CALCAREOUS PLASTICS

No Drawing.  Application filed November 17, 1927. Serial No. 234,043.

This invention relates to hydraulic cements and other calcareous plastics; and it comprises a hydraulic cement (or other calcareous plastic material such as plaster of Paris) to which has been added a quantity, say 5 to 10 per cent, of a swelling clay, of the nature of bentonite, containing added alkali chlorid such as common salt, whereby there is imparted to the cement accelerated ageing properties and increased mechanical strength; all as more fully hereinafter set forth and as claimed.

In patent to O. A. Collings, No. 1,650,864, Nov 29, 1927, and in my own prior Patent, No. 1,601,295, granted September 28, 1926, there are described concretes and other calcareous compositions including swelling clays; and it is pointed out that the addition of a limited quantity of such a mineral of the type known as "bentonite" imparts advantageous waterproofing properties to the set concretes. In these prior inventions the bentonite was, as nearly as possible, retained in its original condition during the gaging and setting of the concrete; the object being to retain it unhydrated and unswollen at this time so that when the concrete dried out and pores developed, the swelling properties of the bentonite would be applicable to the closing of such ports. The present invention also relates to calcareous compositions, and particularly hydraulic cement, containing bentonite but it differs in that the bentonite here is used to take an active part in the actions by which the cement is hydrated and set; its function being to accelerate the ageing of the set cement. For this purpose, and to enhance its properties in this respect, the bentonite receives an addition of an alkali chlorid; advantageously common salt. I also usually bake it somewhat. The various bentonites and other swelling clays found in nature frequently contain alkalis and sometimes a little chlorin; that is sometimes they contain small proportions of alkaline chlorids. There is seldom however, sufficient alkali chlorid for my purpose and I therefore customarily add some, even where analysis shows such chlorids already present. With bentonites free of alkali chlorid the proportion added is greater. Either NaCl or KCl can be added; but I commonly use NaCl (common salt.) The presence, or addition, of alkali chlorid causes a considerable change in the properties of the bentonite as regards water (and cement); this being possibly due to an action on the zeolitic constituents.

These changes are advantageous for my purposes. Seawater may serve as a source of salt.

For the purposes of illustration, I shall speak hereinafter particularly of the commercially available grades of bentonite, which are representative of the types of gelatinizable or swelling clays found in nature. Bentonite exists throughout the western portion of the United States and also in certain localities in Canada. The bentonites have the general chemical composition of the clays, as regards silica, alumina, water of constitution and other chemical ingredients. They are however rather richer in the class of silicates which give zeolitic properties. Their characteristic physical properties do not seem to be wholly dependent on their chemical composition as shown by the ordinary chemical analysis. Bentonite has been proposed for various industrial purposes because of its peculiar stickiness, and its tendency to swell to many times its original volume upon the addition of water. One of these purposes, its use in waterproofing cements, is claimed in the stated patents.

Natural bentonites containing any substantial amount of alkali chlorid are of different properties from those freer of this constituent and are not as applicable to the ordinary purposes of bentonite. For my purposes however they are better adapted.

Bentonite of the ordinary composition in admixture with cement in making concrete under circumstances where the bentonite is allowed to take part in the gaging and setting actions, does not seem to have much influence on these actions. Tests indicate that such bentonite does not have any specific effect either as an accelerator or as a retarder for concrete made with Portland cement nor does bentonite alone increase the mechanical strength of the set material or impart to the mixed plastic an increased rate of setting. Other tests indicate that a small quantity of bentonite added to an ordinary Portland cement concrete mix (1-2-4) neither increases the compressive strength of the set concrete nor accelerates ageing.

I have however found that the results in making concrete are quite different when there is used for making the concrete a cement containing 5 to 10 per cent of added bentonite having a substantial content of alkali chlorid; this content being either natural or artificial. I find that with such a cement the rate of ageing of the set concrete is considerably accelerated and there is an increased final mechanical strength of the concrete. As to the chemical or physical actions flowing from the presence of this salt-containing bentonite I am not certain and I content myself with noting the observed results without speculation as to the reasons.

Most good commercial grades of bentonite are substantially free of chlorin; that is, contain no alkali chlorids. With such bentonites I admix some common salt. For example, two parts by weight of such a commercial bentonite may be mixed with one part of a 20 per cent brine solution; a ratio of about 10:1, dry weights of bentonite and salt. Where the bentonite contains naturally any alkali chlorids, the amount of added salt is concomitantly reduced. While other proportions of salt to bentonite may be used I find this 10:1 ratio satisfactory. With ordinary Portland cement I admix from 5 to 10 per cent of such a salt-containing bentonite. I find that it is also useful to add small amounts of some other materials; for instance finely pulverized set cement. For example, in compounding treated bentonite with Portland cement, a small amount, say less than one per cent, of previously hydrated Portland cement may be pulverized and also added to the cement. Such an addition in conjunction with the saline bentonite seems to exert a specific accelerating function on the setting actions after hydration, increasing the rate of crystallization of the mix. The exact mechanism of the action is not perfectly understood. Other materials may also be incorporated in small quantities with beneficial effects. A lubricant, such as graphite, may be admixed with the bentonite. If desired, the salt may be mixed with the graphite, and the composition thus obtained added to crude bentonite. Addition of a little quicklime is often useful.

In one specific embodiment of my invention, five pounds of bentonite of a quality that would form a gel with ten parts of water were mixed with two and one-half pounds of a 20 per cent brine solution. The mix was then baked until perfectly dry. Five pounds of this mixture were then stirred up with one-quarter pound of graphite and a one-half pound of fresh quicklime. The mixture was then ground so fine that 90 per cent of it would pass a 200 mesh screen. It contained about 5 per cent of alkali salts, mostly all sodium chlorid. This composition mixed with cement and used for making concrete, accelerated ageing in the described way.

The salt treated bentonite, or a mixture containing it such as that just described, may be added to Portland cement, either by the maker or by the user at the time of making concrete. In making a factory mixture, five parts by weight of salt treated bentonite or such a mixture as just described, may be ground with an equal quantity of gypsum and with about half a part by weight of previously hydrated and set cement. The composition is added to the cement clinker going to the grinding mills; the whole being finely pulverized together. It is best to grind the cement clinker and the bentonite together in order to obtain an intimate mixture of the materials. Such material, after grinding, may be sold and used in the same manner as ordinary cement.

The following tables indicate the chemical composition and properties of various ordinary cements as compared to a Portland cement containing treated bentonite made under the present invention.

| Chemical composition | Natural cement | Plain Portland cement | High alumina cement | This invention |
|---|---|---|---|---|
| Lime (CaO) | 53.7% | 61.91% | 39.91% | 64.0% |
| Alumina ($Al_2O_3$) | 12.1 | 7.92 | 39.53 | 7.0 |
| Iron oxide ($Fe_2O_3$) | 3.5 | 2.40 | 15.41 | 2.0 |
| Silica ($SiO_2$) | 26.7 | 20.65 | 2.59 | 22.0 |
| Magnesia (MgO) | 3.6 | 3.54 | 0.73 | 1.4 |
| Sulfur ($SO_3$) | 0.2 | 1.35 | 0.21 | 1.8 |
| Alkalies, chlorids, etc. | | | | 1.8 |
| | 99.8 | 99.77 | 98.38 | 100.00% |

TENSILE STRENGTH—LBS. PER SQ. IN.

| | Natural cement | Plain Portland cement | High alumina cement | This invention |
|---|---|---|---|---|
| 1-3 sand briquets | | | | |
| 24 hours | 0 | 0 | 330 | 464 |
| 7 days | 120 | 250 | 430 | 537 |
| 28 days | 180 | 400 | 538 | 561 |

COMPRESSIVE STRENGTH—LBS. PER SQ. IN.

| | Natural cement | Plain Portland cement | High alumina cement | This invention |
|---|---|---|---|---|
| 1-3 sand cylinders | | | | |
| 24 hours | 0 | 0 | 4725 | 3755 |
| 3 days | 400 | 2500 | 4985 | 9891 |
| 28 days | 1800 | 4500 | 5004 | 12212 |
| 1-2-4 concrete | | | | |
| 24 hours | 0 | 400 | 2865 | 2130 |
| 7 days | 250 | 1200 | 3542 | 3457 |
| 28 days | 1500 | 3800 | 3891 | 5690 |
| Fineness | | | | |
| Passing 200 mesh | 95% | 85% | 97.6% | 95% |

It will be seen that the addition of bentonite containing salines to a hydraulic cement imparts a marked increased tensile and compressive strength to the set cement, making the strength of a bentonite-containing Portland cement much higher than that of a high alumina cement. It will also be observed that the bentonite effects a rapid acceleration of the ageing properties of the cement, the strength of a cement made according to the present invention being greater at the end of one day than the corresponding strength of the plain cement at the end of seven days. While the increased setting and hardening effects are more noticeable at the end of the first day than on any subsequent day, the initial rate of setting is not so rapid as to interfere with the standard practice now used in pouring a concrete mixture made with the cement.

Cement made under the present invention may be used for all ordinary purposes for which cement is used, in makng concrete and the like. The present cement is particularly advantageous for oil well purposes where it is necessary to quickly shut off incoming water. For this purpose its quick setting properties and early high strength particularly adapt it.

What I claim is:

1. As a composition of matter, Portland cement containing bentonite having an alkali-halogen content in excess of that of untreated natural bentonite.

2. As a plastic composition of matter, Portland cement containing bentonite treated with salt.

3. As a plastic composition of matter, Portland cement containing bentonite, alkali metal chlorides, and hydrated cement.

4. As a plastic composition of matter, Portland cement containing bentonite, added common salt, and hydrated cement.

5. A concrete having a binder composed of cement containing salt treated bentonite.

6. As a composition of matter, Portland cement admixed with a product comprising bentonite and alkali-chloride salts; said salts composing up to 10 per cent by weight of said product.

7. As a composition of matter, Portland cement admixed with from 5 to 10 per cent of a product comprising bentonite and alkali-chloride salts; said salts composing up to 10 per cent by weight of said product.

8. As a composition of matter, Portland cement admixed with a product comprising bentonite, alkali-chloride salts, previously hydrated Portland cement and gypsum.

9. As a composition of matter, Portland cement admixed with a product comprising bentonite, alkali-chloride salts, previously hydrated Portland cement, gypsum, graphite and lime.

In testimony whereof, I have hereunto affixed my signature.

WILLIAM ARTHUR COLLINGS.